United States Patent
Bruno et al.

(10) Patent No.: US 9,889,938 B2
(45) Date of Patent: Feb. 13, 2018

(54) RECIRCULATION SYSTEM FOR PARALLEL RAM HEAT EXCHANGERS

(71) Applicant: HAMILTON SUNDSTRAND CORPORATION, Windsor Locks, CT (US)

(72) Inventors: Louis J. Bruno, Ellington, CT (US); Thomas M. Zywiak, Southwick, MA (US); Erin G. Kline, Vernon, CT (US); Christina W. Millot, Wilbraham, MA (US); Donald E. Army, Jr., Enfield, CT (US); Harold W. Hipsky, Willington, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 228 days.

(21) Appl. No.: 14/732,157

(22) Filed: Jun. 5, 2015

(65) Prior Publication Data
US 2016/0355267 A1 Dec. 8, 2016

(51) Int. Cl.
*B64D 13/06* (2006.01)

(52) U.S. Cl.
CPC ...... *B64D 13/06* (2013.01); *B64D 2013/0618* (2013.01); *B64D 2013/0648* (2013.01); *B64D 2013/0688* (2013.01); *Y02T 50/56* (2013.01)

(58) Field of Classification Search
CPC .... B64D 2013/0688; B64D 2013/0618; B64D 2013/0625; B64D 2013/064; B64D 2013/0655
See application file for complete search history.

(56) References Cited

U.S. PATENT DOCUMENTS

| | | | |
|---|---|---|---|
| 2,963,879 A | 12/1960 | De Paravicini | |
| 5,461,882 A | 10/1995 | Zywiak | |
| 6,148,622 A | 11/2000 | Sanger | |
| 6,634,596 B2 | 10/2003 | Albero et al. | |
| 6,845,630 B2 | 1/2005 | Bruno et al. | |
| 6,948,325 B1* | 9/2005 | Axe ...................... | B64D 13/06 62/127 |
| 7,171,819 B2 | 2/2007 | Lui et al. | |

(Continued)

FOREIGN PATENT DOCUMENTS

| | | |
|---|---|---|
| EP | 1329380 A1 | 7/2003 |
| EP | 1439123 A2 | 7/2004 |

(Continued)

OTHER PUBLICATIONS

EP Communication; Extended European Search Report; Application No. 16155275.7-1754; dated May 7, 2016; pp. 1-7.

(Continued)

*Primary Examiner* — Cassey D Bauer
(74) *Attorney, Agent, or Firm* — Cantor Colburn LLP

(57) ABSTRACT

A system includes an inlet line configured to receive a medium flowing from a low-pressure location of an engine to a chamber, a plurality of heat exchangers configured to receive the medium from the inlet line, and a valve located upstream from the plurality of heat exchangers. The valve is configured to divide in parallel the medium across at least a first heat exchanger and a second heat exchanger of the plurality of heat exchangers. A recirculation air system is configured to supply a recirculation.

16 Claims, 3 Drawing Sheets

(56) References Cited

U.S. PATENT DOCUMENTS

| | | |
|---|---|---|
| 8,266,888 B2 | 9/2012 | Liu |
| 8,839,641 B1 | 9/2014 | Plattner |
| 2005/0011217 A1 | 1/2005 | Brutscher et al. |
| 2008/0242209 A1 | 10/2008 | Steinmaier et al. |
| 2008/0264084 A1 | 10/2008 | Derouineau et al. |
| 2009/0084122 A1 | 4/2009 | Montero |
| 2009/0291625 A1* | 11/2009 | Klimpel ............. B64D 13/02 454/71 |
| 2010/0323601 A1 | 12/2010 | Cremers et al. |
| 2013/0098092 A1 | 4/2013 | Wakamoto et al. |
| 2013/0240144 A1 | 9/2013 | Buchberger et al. |
| 2013/0277009 A1 | 10/2013 | Army |
| 2015/0065025 A1 | 3/2015 | Bruno et al. |
| 2016/0229542 A1 | 8/2016 | Bruno et al. |

FOREIGN PATENT DOCUMENTS

| | | |
|---|---|---|
| EP | 1457420 A1 | 9/2004 |
| EP | 1857361 A2 | 11/2007 |
| EP | 2845804 A1 | 3/2015 |
| JP | H09318206 A | 12/1997 |

OTHER PUBLICATIONS

EP Communication; Extended European Search Report; Application No. 16173114.6-1757; dated Nov. 11, 2016; pp. 1-8.
Final Office Action: U.S. Appl. No. 14/619,632, filed Feb. 11, 2015; Environmental Control System Utilizing Parallel Ram Heat Exchangers; Notification Date: Sep. 20, 2017; 27 Pages.

* cited by examiner

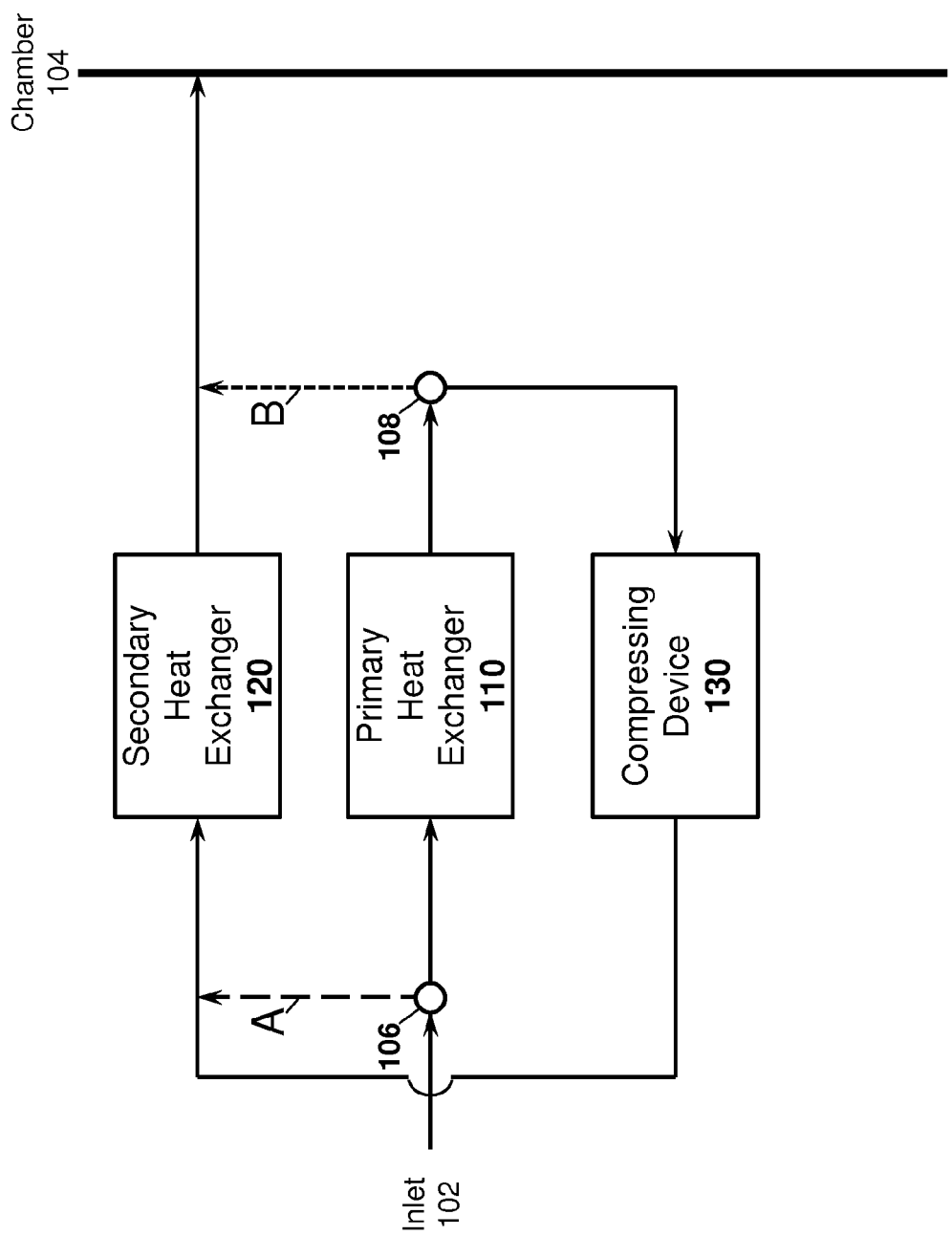

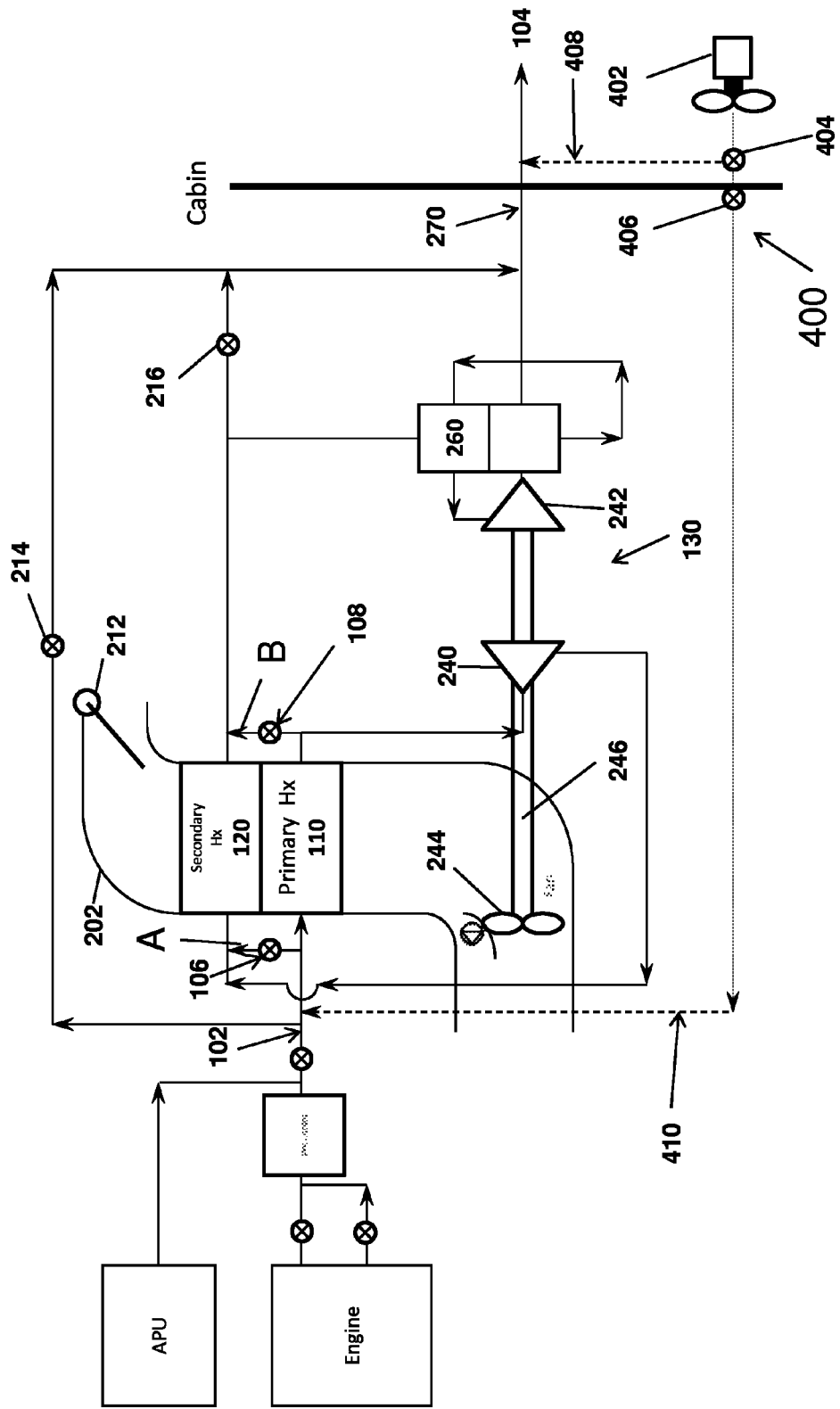

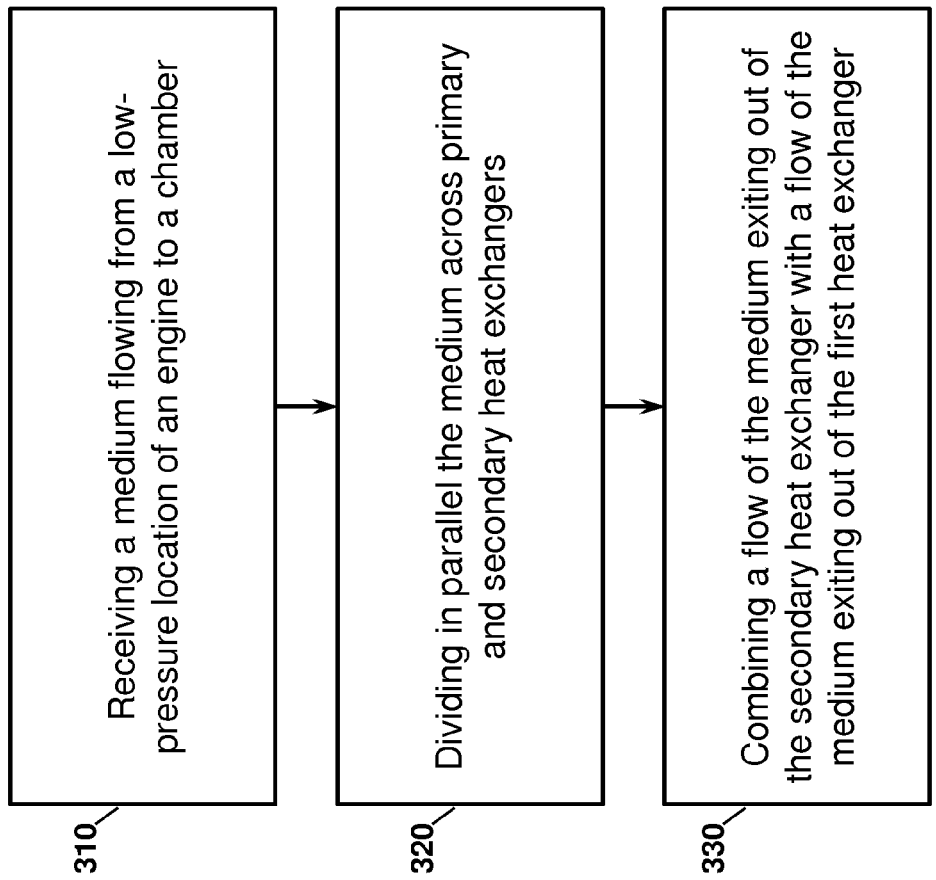

RECIRCULATION SYSTEM FOR PARALLEL RAM HEAT EXCHANGERS

BACKGROUND

In general, with respect to present air conditioning systems of aircraft, cabin pressurization and cooling is powered by engine bleed pressures at cruise. For example, pressurized air from an engine of the aircraft is provided to a cabin through a series of systems that alter the temperatures and pressures of the pressurized air. To power this preparation of the pressurized air, the only source of energy is the pressure of the air itself. As a result, the present air conditioning systems have always required relatively high pressures at cruise. Unfortunately, in view of an overarching trend in the aerospace industry towards more efficient aircraft, the relatively high pressures provide limited efficiency with respect to engine fuel burn.

SUMMARY

According to one aspect, a system is provided. The system includes an inlet line configured to receive a medium flowing from a low-pressure location of an engine to a chamber, a plurality of heat exchangers configured to receive the medium from the inlet line, and a valve located upstream from the plurality of heat exchangers. The valve is configured to divide in parallel the medium across at least a first heat exchanger and a second heat exchanger of the plurality of heat exchangers. A recirculation air system is configured to supply a recirculation air from the chamber to the inlet line upstream of the plurality of heat exchangers.

In addition to one or more of the features described above, or as an alternative, further embodiments may include: wherein the recirculation air system includes a recirculation bleed line fluidly coupled between the chamber and the inlet line; a chamber supply line configured to supply the medium from the plurality of heat exchangers to the chamber; wherein the recirculation air system includes a chamber recirculation line fluidly coupled between the chamber and the chamber supply line, the chamber recirculation line configured to supply recirculation air from the chamber to the chamber supply line; wherein the recirculation air system includes a first recirculation valve to selectively supply a first portion of recirculation air to the chamber recirculation line, and a second recirculation valve to selectively supply a second portion of recirculation air to the inlet line; wherein a flow of the medium exiting out of the secondary heat exchanger is combined through an activation of a second valve that forwards a flow of the medium exiting out of the first heat exchanger; wherein a first temperature of the medium at the valve is reduced when the medium flows across the first heat exchanger and the second heat exchanger in parallel to a second temperature; wherein ram air cooling provides sufficient energy to the plurality of heat exchangers to reduce the first temperature to the second temperature; wherein a pressure of the medium at the low-pressure location of an engine is slightly above a chamber pressure; a compressing device, in communication with the plurality of heat exchangers, configured to regulate a pressure of the medium, wherein the medium bypasses the compressing device when the valve divides in parallel the medium across at least the first heat exchanger and the second heat exchanger; and/or wherein the system is an environmental control system of an aircraft, wherein the medium is air bled from an engine of the aircraft, and wherein the chamber is a cabin of the aircraft.

According to another aspect, a method of performing a heat exchanger cooling mode is provided. The method includes receiving, by an inlet line with a first valve, a medium flowing from a low-pressure location of an engine to a chamber, and dividing in parallel, by the first valve located upstream from a plurality of heat exchangers, the medium across at least a first heat exchanger and a second heat exchanger of the plurality of heat exchangers. The method further includes combining, by a second valve, a flow of the medium exiting out of the secondary heat exchanger with a flow of the medium exiting out of the first heat exchanger, and recirculating, by a recirculation air system, a recirculation air from the chamber to the inlet line upstream of the first valve and the plurality of heat exchangers to subsequently mix the recirculation air and the medium.

In addition to one or more of the features described above, or as an alternative, further embodiments may include: bypassing a compressing device, in communication with the plurality of heat exchangers, in accordance with the combining, by the second valve, of the flow of the medium exiting out of the secondary heat exchanger with the flow of the medium exiting out of the first heat exchanger; reducing a first temperature of the medium at the first valve when the medium flows across the first heat exchanger and the second heat exchanger in parallel to a second temperature; providing ram air cooling to the plurality of heat exchangers to reduce the first temperature to the second temperature; wherein a pressure of the medium at the low-pressure location of an engine is slightly above a chamber pressure; and/or wherein the first valve, the second valve, and the plurality of heat exchangers are included in an environmental control system of an aircraft, wherein the medium is air bled from an engine of the aircraft, and wherein the chamber is a cabin of the aircraft.

Additional features and advantages are realized through the techniques of the present disclosure. Other embodiments and aspects of the disclosure are described in detail herein and are considered a part of the claimed disclosure. For a better understanding of the disclosure with the advantages and the features, refer to the description and to the drawings.

BRIEF DESCRIPTION OF THE DRAWINGS

The subject matter which is regarded as the disclosure is particularly pointed out and distinctly claimed in the claims at the conclusion of the specification. The forgoing and other features, and advantages of the disclosure are apparent from the following detailed description taken in conjunction with the accompanying drawings in which:

FIG. 1 is a schematic diagram of an environmental control system according to one embodiment;

FIG. 2 is a schematic diagram of an environmental control system according to another embodiment; and FIG. 3 is a flow chart illustrating an exemplary method of controlling the system shown in FIGS. 1 and 2.

DETAILED DESCRIPTION

A detailed description of one or more embodiments of the disclosed apparatus and method are presented herein by way of exemplification and not limitation with reference to the Figures.

As indicated above, the relatively high pressures provide limited efficiency with respect to engine fuel burn. Thus, what is needed is an environmental control system that provides a fluid medium in parallel across a plurality of heat exchangers to provide cabin pressurization and cooling at a high engine fuel burn efficiency.

In general, embodiments of the present disclosure disclosed herein may include a system comprising a plurality of heat exchangers and a medium flowing through the plurality of heat exchangers, wherein the medium is bled from a low-pressure location of an engine through the plurality of heat exchangers in parallel into a chamber. The low-pressure location of the engine provides the medium at an initial pressure level near a pressure of the medium once it is in the chamber (e.g., chamber pressure). In contrast, conventional systems utilize an initial pressure level that is much greater that the pressure chamber. For example, if a desired chamber pressure is 5 psia, conventional systems will bleed air from a higher pressure location of the engine that provides an initial pressure level at three times the chamber pressure (e.g., 15 psia). Further, the pressure of the medium at the low-pressure location may be slightly above or slightly below the chamber pressure (e.g., any value along the range of 4 to 7 psia when the chamber pressure is 5 psia).

Bleeding the medium at such a low pressure from the low-pressure location causes less fuel burn than bleeding air from a higher pressure location. Yet, because the medium is starting at this relatively low initial pressure level and because a drop in pressure occurs over the plurality of heat exchangers, the medium will drop below the chamber pressure while the medium is flowing through the plurality of heat exchangers. When the pressure of the medium is below the pressure of the chamber the medium will not flow into the chamber to provide pressurization and temperature conditioning. Thus, the system splits a flow of the medium into pieces so that the medium can go into at least two heat exchangers in parallel to allow for connecting to the low-pressure location.

FIG. 1 illustrates a system 100 with a fluid medium (e.g., air) flowing from an inlet 102 to a chamber 104 though valves 106, 108, a primary heat exchanger 110, a secondary heat exchanger 120, and a compressing device 130.

In general, the system 100 supplies a fluid medium to any environment (e.g., chamber 104), thereby providing regulation and/or monitoring of that environment. In one embodiment, the system 100 is any environmental control system of a vehicle, such as an aircraft, that provides air supply, thermal control, and cabin pressurization for a crew and passengers of the aircraft. Environmental control systems may also include avionics cooling, smoke detection, and/or fire suppression. Further, with respect to the aircraft example, the system 100 supplies a fluid medium such as pressurized air to a flight deck of the aircraft (e.g., the chamber 104), for both comfort and pressurization. The air is supplied to the system 100 at inlet 102 by being "bled" from a compressor stage of an aircraft engine and/or directly from exterior air (e.g., via a ram air system). The temperature and pressure of this "bleed air" varies widely depending upon which compressor stage and a revolutions per minute of the aircraft engine. To achieve the desired temperature, the bleed air is cooled as it is passed through the heat exchangers 110, 120. To achieve the desired pressure, the bleed air is compressed as it is passed through the device 130. Note that the interaction of the system 100 with the aircraft engine influences how much fuel burn by the aircraft engine is needed to perform operations, such as supplying pressurized air, related to that interaction.

Valves, such as valves 106, 108, are devices that regulate, direct, and/or control a flow of the fluid medium (e.g., gases, liquids, fluidized solids, or slurries, such as bleed air) by opening, closing, or partially obstructing various passageways within the tubes, pipes, etc. of the system 100. Valves may be operated by actuators such that the flow rates of any medium in any portion of the system 100 may be regulated to a desired value. For example, the valve 106 enables a flow of the medium from inlet 102 to be divided across the primary heat exchanger 110 and the secondary heat exchanger 120. Further, the valve 108 enables a flow of the medium from the primary heat exchanger 110 to be sent to the compressing device 130 and/or chamber 104.

Heat exchangers (e.g., the primary heat exchanger 110 and the secondary heat exchanger 120) are equipment built for efficient heat transfer from one medium to another. Examples of heat exchangers include double pipe, shell and tube, plate, plate and shell, adiabatic wheel, plate fin, pillow plate, and fluid heat exchangers. Continuing with the aircraft example above, air forced by a fan (e.g., via push or pull methods) and/or rammed during flight is blown across the heat exchanger at a variable cooling airflow to control the final air temperature of the bleed air.

The compressing device 130 (e.g., an air cycle machine as described below) is a mechanical device that regulates a pressure of a medium (e.g., increasing the pressure of a gas). Examples of a compressor include centrifugal, diagonal or mixed-flow, axial-flow, reciprocating, ionic liquid piston, rotary screw, rotary vane, scroll, diaphragm, air bubble compressors. Further, compressors are typically driven by an electric motor or a steam or a gas turbine.

In one operation, the system 100 can bypass the compressing device 130 by activating the valve 108 to divide the flow of the medium from inlet 102 into the primary heat exchanger 110 and the secondary heat exchanger 120 (e.g., line A). Both heat exchangers 110, 120 cool their respective portions of the medium. Then, the flow of the medium exiting out of the secondary heat exchanger 120 is combined through the activation of valve 108 with flow of the medium exiting out of the primary heat exchanger 110 (e.g., line B). This operation may be called a heat exchanger cooling mode that lowers the pressure of the medium near that of the chamber pressure.

The system 100 of FIG. 1 will now be described with reference to FIG. 2, in view of the aircraft example above. FIG. 2 illustrates an environmental control system 200 (e.g., an embodiment of system 100) that includes, in additional to the previously described items of FIG. 1, a shell 202, valves 212, 214, 216, the compressing device 130 (that includes a compressor 240, a turbine 242, a fan 244, and a shaft 246), and a high pressure water separator 260, each of which are connected via tubes, pipes, ducts and the like, such that bleed air is accepted at the inlet 102 (e.g., high- or low-pressure location of an engine of an aircraft) and provided to the chamber 104 (e.g., cabin, flight deck, etc.).

The environmental control system 200 is an example of an environmental control system of an aircraft that provides air supply, thermal control, and cabin pressurization for the crew and passengers of the aircraft. The shell 202 is an example of a ram chamber of a ram system which uses dynamic air pressure created by an aircraft in motion to increase a static air pressure inside of the shell. Valves 212, 214, 216 are examples of valves described above.

The compressing device 130 can be an air cycle machine that regulates a pressure of a medium (e.g., increasing the pressure of a bleed air). The turbine 242 is a mechanical device that drives the compressor 240 and fan 244 via the shaft 246. The compressor 240 is a mechanical device that compresses the bleed air received from a first heat exchanger (e.g., the primary heat exchanger 110). The fan 244 is a mechanical device that forces via push or pull methods air through the shell 202 across the heat exchangers at a variable cooling airflow. The compressor 240, the turbine 242, and the fan 244 together regulate pressure and illustrate, for example, that the air cycle machine (e.g., the compressing device 130) may operate as a three-wheel air cycle machine. In turn, the three-wheel air cycle machine may include addition of components, such as a power turbine that utilizes exhaust from the chamber 104 to provide additional power to the compressing device 130.

The high pressure water separator 260 is a mechanical device that performs operation of a heat exchanger described above and/or a process of removing water from the bleed air, either temporarily or permanently.

In one operation, bleed air is accepted at inlet 102 from a high-pressure location of an engine of an aircraft at an initial flow rate, pressure (e.g., 35 psia), and temperature that is much greater a final flow rate, pressure (e.g., 12 psia), and temperature. The bleed air is fed through the primary heat exchanger 110, which through cooling lowers the temperature to the compressor 240, which then raises the pressure. Then, due to the valves 214, 216 being closed the bleed air is fed through the secondary heat exchanger 120, which also through cooling lowers the temperature to the high pressure water separator 260. The resulting cold, dry air is subsequently supplied to chamber 104 via a cooling air line 270.

In another operation, a cooling mode operation may be performed by the environmental control system 200. The cooling mode operation will now be described with respect to FIG. 3. In the exemplary embodiment, FIG. 3 illustrates a process flow 300 that begins at block 310 where the bleed air is accepted at inlet 102 from a low-pressure location of an engine of an aircraft at an initial flow rate, pressure (e.g., 13 psia), and temperature that is near a final flow rate, pressure, and temperature. Then, at block 320, due to the activation of the valves 106, 108, the bleed air is divided across both the primary heat exchanger 110 and the secondary heat exchanger 120 (e.g., in parallel), such that a first temperature of the bleed air at the valve 106 is collectively reduced to a second temperature that can be at or near a temperature of the chamber 104. That is, the environmental control system 200 can bypass the compressing device 130 by activating the valve 108 to divide a flow of the bleed from inlet 102 into the primary heat exchanger 110 and the secondary heat exchanger 120 (e.g., line A). Both heat exchangers, in turn, cool their respective portions of the bleed air. Then, at block 330, a flow of the bleed air exiting out of the secondary heat exchanger 120 is combined through the activation of valve 108 with a flow of the bleed exiting out of the primary heat exchanger 110 (e.g., line B). In general, the cooling mode operation may be called a heat exchanger cooling mode that lowers the temperature of the bleed air to a temperature required by the chamber. The cooling mode operation may be utilized when ram air cooling for the heat exchangers 110, 120 is adequate (e.g., ram air provides sufficient energy to the heat exchangers 110, 120 to reduce the temperature of the bleed air) and the pressure of the bleed air is high enough to maintain a pressure through the environmental control system 200 without the compressing device 130.

In the exemplary embodiment illustrated in FIG. 2, environmental control system 200 includes a recirculation air system 400 that generally includes a fan 402, a first valve 404, a second valve 406, a chamber recirculation line 408, and a recirculation bleed line 410. Fan 402 is configured to supply recirculation air from chamber 104 through lines 408 and 410. First valve 404 is configured to selectively supply recirculation air through line 408, and second valve 406 is configured to selectively supply recirculation air through line 410. Chamber recirculation line 408 is fluidly coupled between chamber 104 and cabin supply line 270, and is configured to supply recirculation air from chamber 104 to mix with the cool, dry air in cabin supply line 270. Recirculation bleed line 410 is fluidly coupled between chamber 104 and inlet line 102, and is configured to supply recirculation air from chamber 104 to mix with the bleed air supplied to inlet line 102.

System 200 may be operated in a first cooling mode where first valve 404 is open and second valve 406 is closed. Fan 402 forces a first portion of recirculation air from chamber 104 through recirculation line 408 to cooling air line 270. The first portion of recirculation air is subsequently mixed with the cool, dry air in line 270 and is supplied to chamber 104.

System 200 may be operated in a second, low pressure, heat exchanger cooling only mode, for example when at cruising altitude when ram air temperatures are low. In the second cooling mode, second valve 406 is opened, and fan 402 forces a second portion of recirculation air from chamber 104 through recirculation bleed line 410 to inlet line 102. The second portion of recirculation air is subsequently mixed with the bleed air at a point downstream of the engine and/or APU and upstream of valve 106, primary heat exchanger 110, and secondary heat exchanger 120. In this mode, both primary heat exchanger 110 and secondary heat exchanger 120 receive bleed air mixed with the recirculation air, and the air mixture is subsequently recombined downstream of heat exchangers 110 and 120. The mixture is subsequently supplied to line 270, mixed with recirculation air from line 408, and supplied to chamber 104.

As such, when operating in the second mode, the air pressure at the inlets of heat exchangers 110, 120 is slightly (e.g., 1-2 psi) above cabin pressure. Mixing the second portion of recirculation air with the bleed air upstream of heat exchangers 110, 120 reduces the ram air flow and airplane drag. Additionally, mixing the recirculation air with the bleed air mitigates the risk of freezing the recirculation air if a heat exchanger (not shown) was utilized to cool the recirculation air alone. Accordingly, system 200 does not require a separate heat exchanger to cool the recirculation air.

Aspects of the present disclosure are described herein with reference to flowchart illustrations, schematics, and/or block diagrams of methods, apparatus, and/or systems according to embodiments of the disclosure. Further, the descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The flow diagrams depicted herein are just one example. There may be many variations to this diagram or the steps (or operations) described therein without departing from the spirit of the disclosure. For instance, the steps may be performed in a differing order or steps may be added, deleted or modified. All of these variations are considered a part of the claimed disclosure.

While the preferred embodiment to the disclosure had been described, it will be understood that those skilled in the art, both now and in the future, may make various improvements and enhancements which fall within the scope of the claims which follow. These claims should be construed to maintain the proper protection for the disclosure first described.

What is claimed is:

1. A system, comprising:
an inlet line configured to receive a medium flowing from a low-pressure location of an engine to a chamber;
a plurality of heat exchangers configured to receive the medium from the inlet line;
a valve located upstream from the plurality of heat exchangers, the valve configured to divide in parallel the medium across at least a first heat exchanger and a second heat exchanger of the plurality of heat exchangers;
another valve located downstream of the plurality of heat exchanger, the another valve being operable to direct a flow of medium exiting from the first heat exchanger to combine with a flow of the medium exiting the second heat exchanger; and
a recirculation air system configured to supply a recirculation air from the chamber to the inlet line upstream of the plurality of heat exchangers.

2. The system of claim 1, wherein the recirculation air system includes a recirculation bleed line fluidly coupled between the chamber and the inlet line.

3. The system of claim 2, further comprising a chamber supply line configured to supply the medium from the plurality of heat exchangers to the chamber.

4. The system of claim 3, wherein the recirculation air system includes a chamber recirculation line fluidly coupled between the chamber and the chamber supply line, the chamber recirculation line configured to supply recirculation air from the chamber to the chamber supply line.

5. The system of claim 4, wherein the recirculation air system includes:
a first recirculation valve to selectively supply a first portion of recirculation air to the chamber recirculation line; and
a second recirculation valve to selectively supply a second portion of recirculation air to the inlet line.

6. The system of claim 1, wherein a first temperature of the medium at the valve is reduced when the medium flows across the first heat exchanger and the second heat exchanger in parallel to a second temperature.

7. The system of claim 6, wherein ram air cooling provides sufficient energy to the plurality of heat exchangers to reduce the first temperature to the second temperature.

8. The system of claim 1, wherein a pressure of the medium at the low-pressure location of an engine is slightly above a chamber pressure.

9. The system of claim 1, further comprising:
a compressing device, in communication with the plurality of heat exchangers, configured to regulate a pressure of the medium,
wherein the medium bypasses the compressing device when the valve divides in parallel the medium across at least the first heat exchanger and the second heat exchanger.

10. The system of claim 1, wherein the system is an environmental control system of an aircraft,
wherein the medium is air bled from an engine of the aircraft, and
wherein the chamber is a cabin of the aircraft.

11. A method of performing a heat exchanger cooling mode, comprising:
receiving, by an inlet line with a first valve, a medium flowing from a low-pressure location of an engine to a chamber;
dividing in parallel, by the first valve located upstream from a plurality of heat exchangers, the medium across at least a first heat exchanger and a second heat exchanger of the plurality of heat exchangers;
combining, by a second valve, a flow of the medium exiting out of the secondary heat exchanger with a flow of the medium exiting out of the first heat exchanger; and
recirculating, by a recirculation air system, a recirculation air from the chamber to the inlet line upstream of the first valve and the plurality of heat exchangers to subsequently mix the recirculation air and the medium.

12. The method of claim 11, further comprising:
bypassing a compressing device, in communication with the plurality of heat exchangers, in accordance with the combining, by the second valve, of the flow of the medium exiting out of the secondary heat exchanger with the flow of the medium exiting out of the first heat exchanger.

13. The method of claim 11, further comprising:
reducing a first temperature of the medium at the first valve when the medium flows across the first heat exchanger and the second heat exchanger in parallel to a second temperature.

14. The method of claim 11, further comprising:
providing ram air cooling to the plurality of heat exchangers to reduce the first temperature to the second temperature.

15. The method of claim 11, wherein a pressure of the medium at the low-pressure location of an engine is slightly above a chamber pressure.

16. The method of claim 11, wherein the first valve, the second valve, and the plurality of heat exchangers are included in an environmental control system of an aircraft,
wherein the medium is air bled from an engine of the aircraft, and
wherein the chamber is a cabin of the aircraft.

* * * * *